US011610081B2

(12) United States Patent
Girard et al.

(10) Patent No.: US 11,610,081 B2
(45) Date of Patent: Mar. 21, 2023

(54) METHOD FOR AUGMENTING A TRAINING IMAGE BASE REPRESENTING A PRINT ON A BACKGROUND BY MEANS OF A GENERATIVE ADVERSARIAL NETWORK

(71) Applicant: Idemia Identity & Security France, Courbevoie (FR)

(72) Inventors: Fantin Girard, Courbevoie (FR); Cédric Thuillier, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 171 days.

(21) Appl. No.: 17/085,492

(22) Filed: Oct. 30, 2020

(65) Prior Publication Data
US 2021/0142113 A1 May 13, 2021

(30) Foreign Application Priority Data
Nov. 7, 2019 (FR) ...................... 1912530

(51) Int. Cl.
*G06K 9/62* (2022.01)
*G06N 3/04* (2006.01)
*G06N 3/08* (2006.01)
*G06V 40/12* (2022.01)

(52) U.S. Cl.
CPC ......... *G06K 9/6257* (2013.01); *G06K 9/6267* (2013.01); *G06N 3/0454* (2013.01);
(Continued)

(58) Field of Classification Search
CPC .. G06K 9/6257; G06K 9/6267; G06K 9/6273; G06N 3/0454; G06N 3/0472;
(Continued)

(56) References Cited

U.S. PATENT DOCUMENTS

2018/0165508 A1* 6/2018 Othman ................. G06V 40/70
2018/0286034 A1* 10/2018 Lim ......................... G06N 3/08
(Continued)

FOREIGN PATENT DOCUMENTS

GB 2526874 A 12/2015

OTHER PUBLICATIONS

Indu Joshi ,"Latent Fingerprint Enhancement using Generative Adversarial Networks," Mar. 7, 2019, 2019 IEEE Winter Conference on Applications of Computer Vision (WACV), pp. 895-902.*
(Continued)

*Primary Examiner* — Omar S Ismail
(74) *Attorney, Agent, or Firm* — Womble Bond Dickinson (US) LLP

(57) ABSTRACT

Methods for augmenting a training image base representing a print on a background, for training parameters of a convolutional neural network, CNN, or for classification of an input image
The present invention relates to a method for augmenting a training image base representing a print on a background, characterized in that it comprises the implementation, by data processing means (11) of a server (1), of steps of:
(b) For at least a first image of said base, and a ridge map of a second print different from the print represented by said first image, generation by means of at least one generator sub-network ($G_B$, $G_M$, $G_{LT}$) of a generative adversarial network, GAN, of a synthetic image presenting the background of said first image and representing the second print.

18 Claims, 7 Drawing Sheets

(52) U.S. Cl.
CPC ........... *G06N 3/08* (2013.01); *G06V 40/1359* (2022.01); *G06V 40/1376* (2022.01)

(58) Field of Classification Search
CPC .......... G06N 3/08; G06N 3/084; G06V 10/82; G06V 40/1359; G06V 40/1376; G06V 40/1388
See application file for complete search history.

(56) References Cited

U.S. PATENT DOCUMENTS

| | | | | |
|---|---|---|---|---|
| 2018/0286055 | A1* | 10/2018 | Lim | G06N 3/084 |
| 2018/0288086 | A1* | 10/2018 | Amiri | G06N 3/082 |
| 2018/0293734 | A1* | 10/2018 | Lim | G06V 10/764 |
| 2019/0213705 | A1* | 7/2019 | Kamath | G06T 11/20 |
| 2019/0362130 | A1* | 11/2019 | Othman | G06V 40/1371 |
| 2020/0320289 | A1* | 10/2020 | Su | G06V 10/82 |
| 2020/0372351 | A1* | 11/2020 | Chang | G06T 7/90 |
| 2020/0388014 | A1* | 12/2020 | Hiasa | G06N 3/08 |
| 2021/0073646 | A1* | 3/2021 | Junginger | G06N 3/084 |

OTHER PUBLICATIONS

Jinyuan Zhao,"Document image binarization with cascaded generators of conditional generative adversarial networks," Jul. 12, 2019, Pattern Recognition vol. 96( 2019) , pp. 1-10.*

Mohamed Attia,"Fingerprint Synthesis Via Latent Space Representation", Nov. 28, 2019, 2019 IEEE International Conference on Systems, Man and Cybernetics (SMC) Bari, Italy. Oct. 6-9, 2019, pp. 1855-1860.*

Gengxing Wang,"Generative Adversarial Network (GAN) based Data Augmentation for Palmprint Recognition," Jan. 17, 2019, 2018 Digital Image Computing: Techniques and Applications (DICTA), pp. 1-5.*

He Zhang,"Synthesis of High-Quality Visible Faces from Polarimetric Thermal Faces using Generative Adversarial Networks," Mar. 22, 2019, International Journal of Computer Vision (2019),127, pp. 845-855.*

Younghak Shin et al.: "Abnormal Colon Polyp Image Synthesis Using Conditional Adversarial Networks for Improved Detection Performance", IEEE ACCSS, vol. 6, Oct. 1, 2018, pp. 56007-56017, XP055712734, DOI:10.1109/ACCESS.2018.2872717; Abstract; Section II.E; figures 1,4, 6.

Lee Min Beom et al.: "Conditional Generative Adversarial Network-Based Data Augmentation for Enhancement of Iris Recognition Accuracy", IEEE ACCESS, vol. 7, Sep. 11, 2019, pp. 122134-122152, XP011744741, DOI: 10.1109/ACCESS.2019.2937809 [extracted on Sep. 6, 2019] Section IV, references [15] and [16].

Joshi Indu et al: "Latent Fingerprint Enhancement Using Generative Adversarial Networks", 2019 IEEE Winter Conference on Applications of Computer Vision (WACV), IEEE Jan. 7, 2019, pp. 895-903, XP033525662, DOI: 10.1109/WACV.2019.0100 [extracted on Mar. 4, 2019] Section 2.

* cited by examiner

[Fig 1]
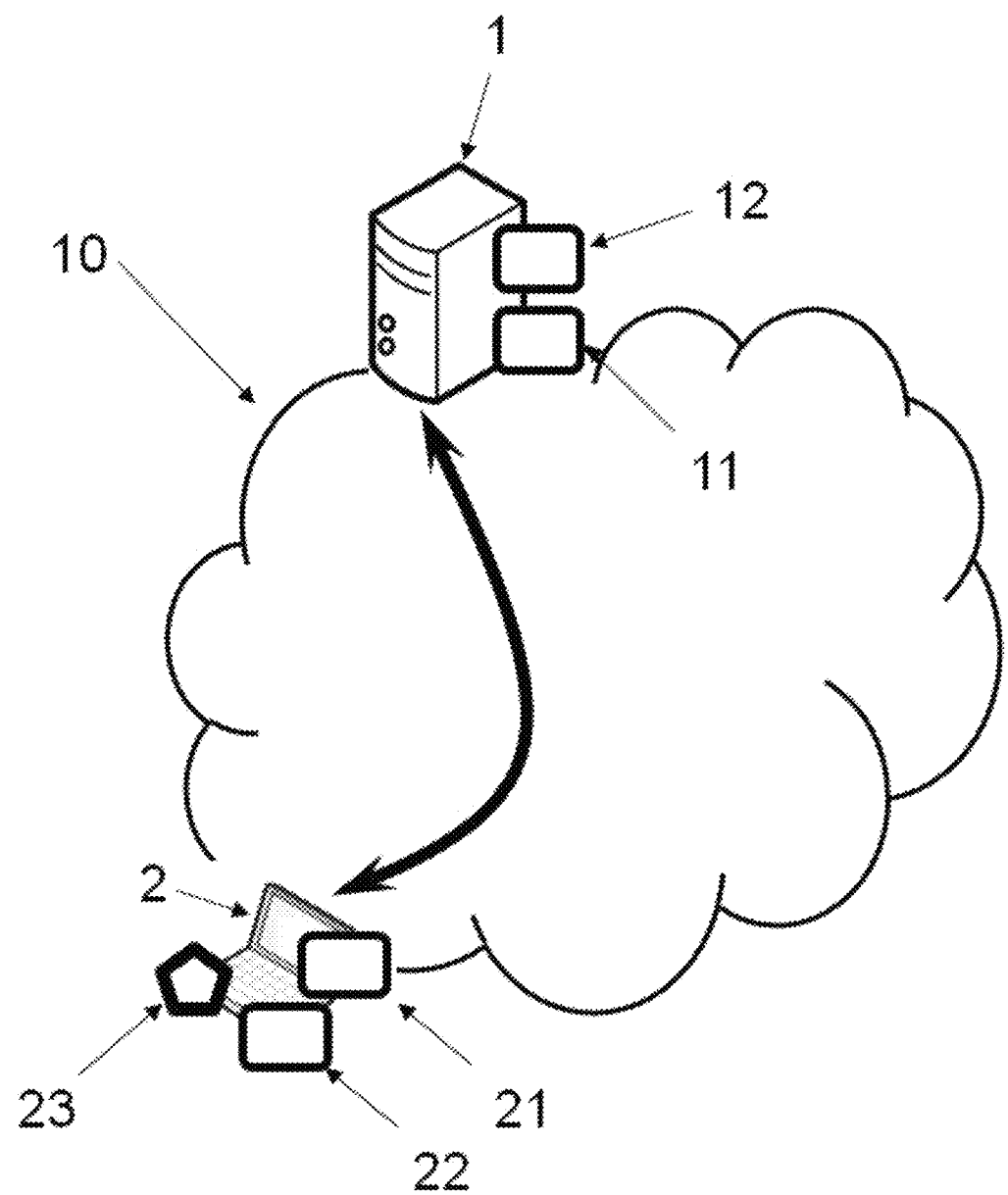

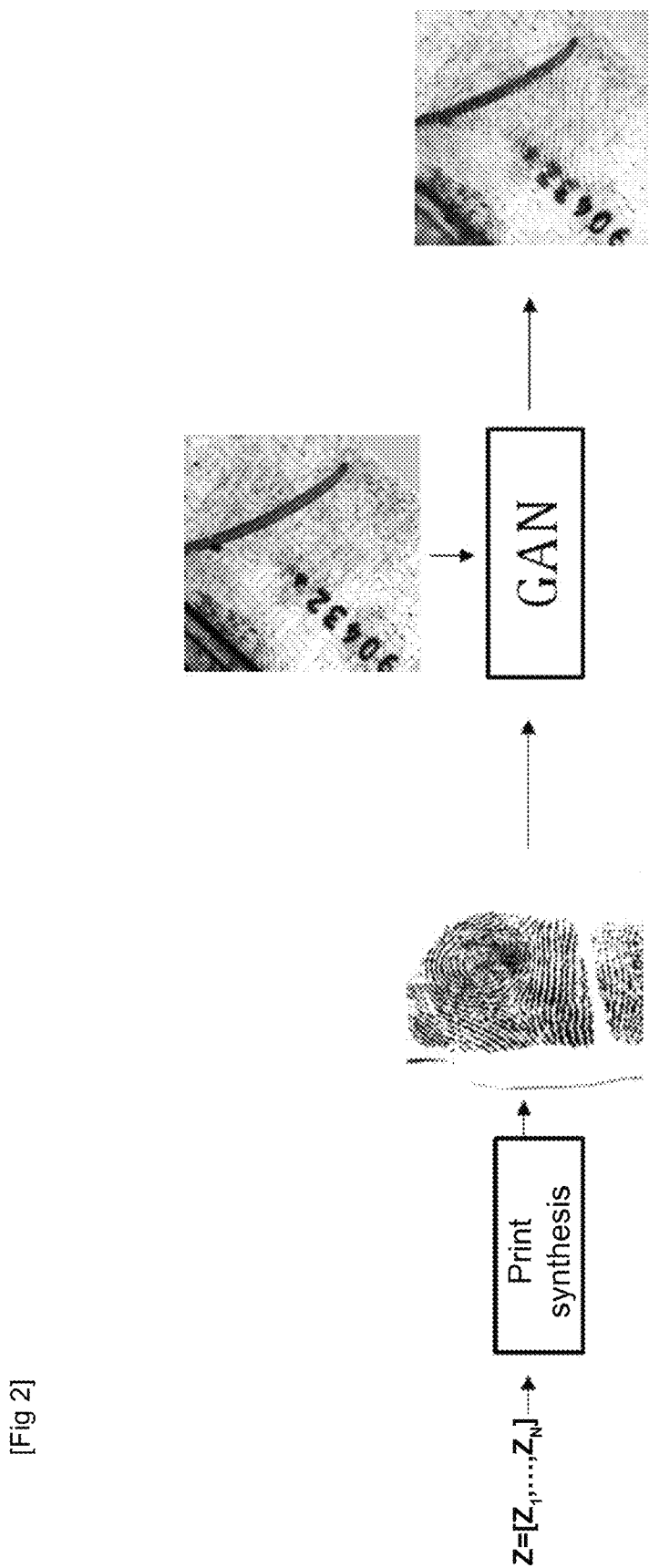
[Fig 2]

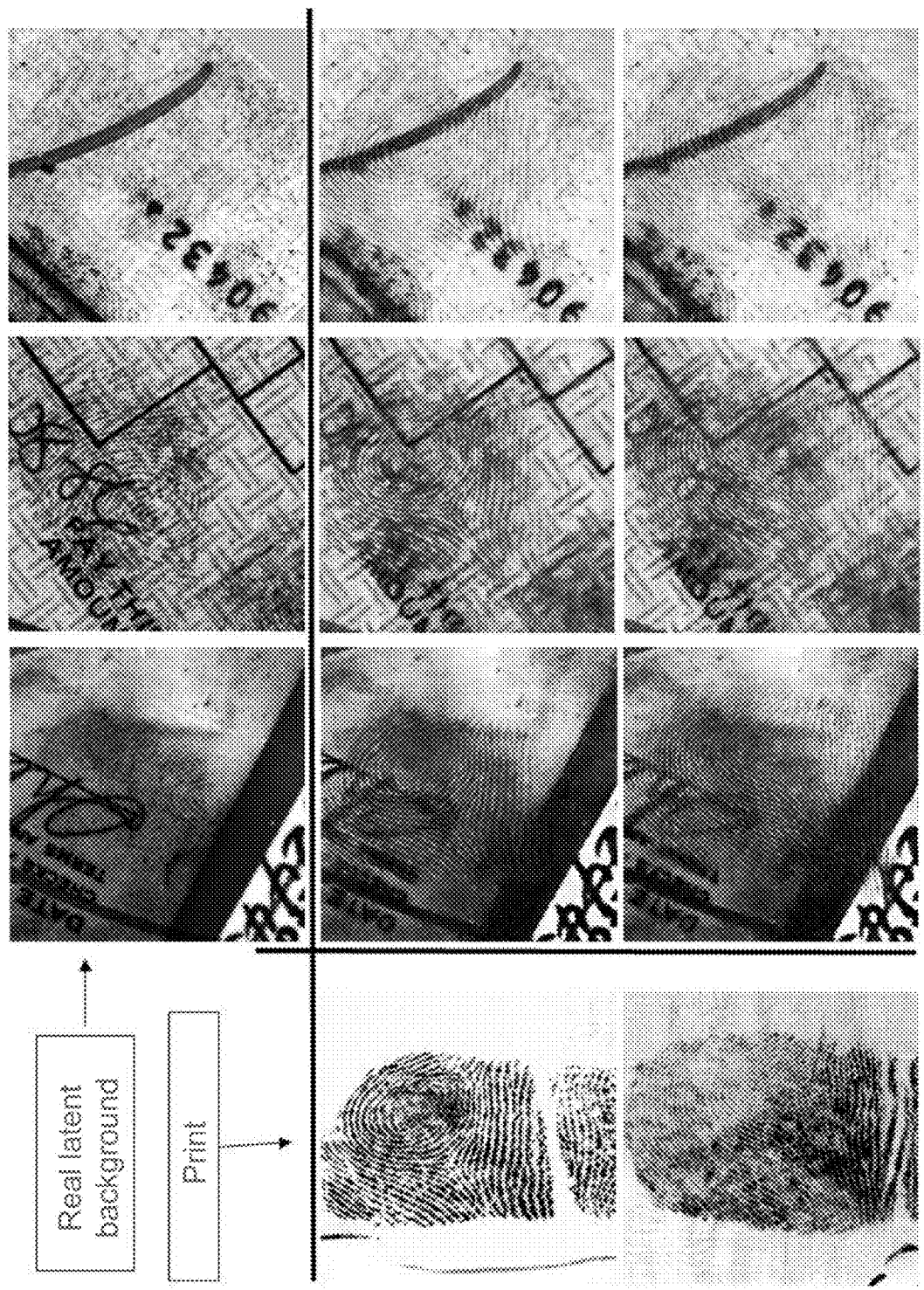
[Fig 3]

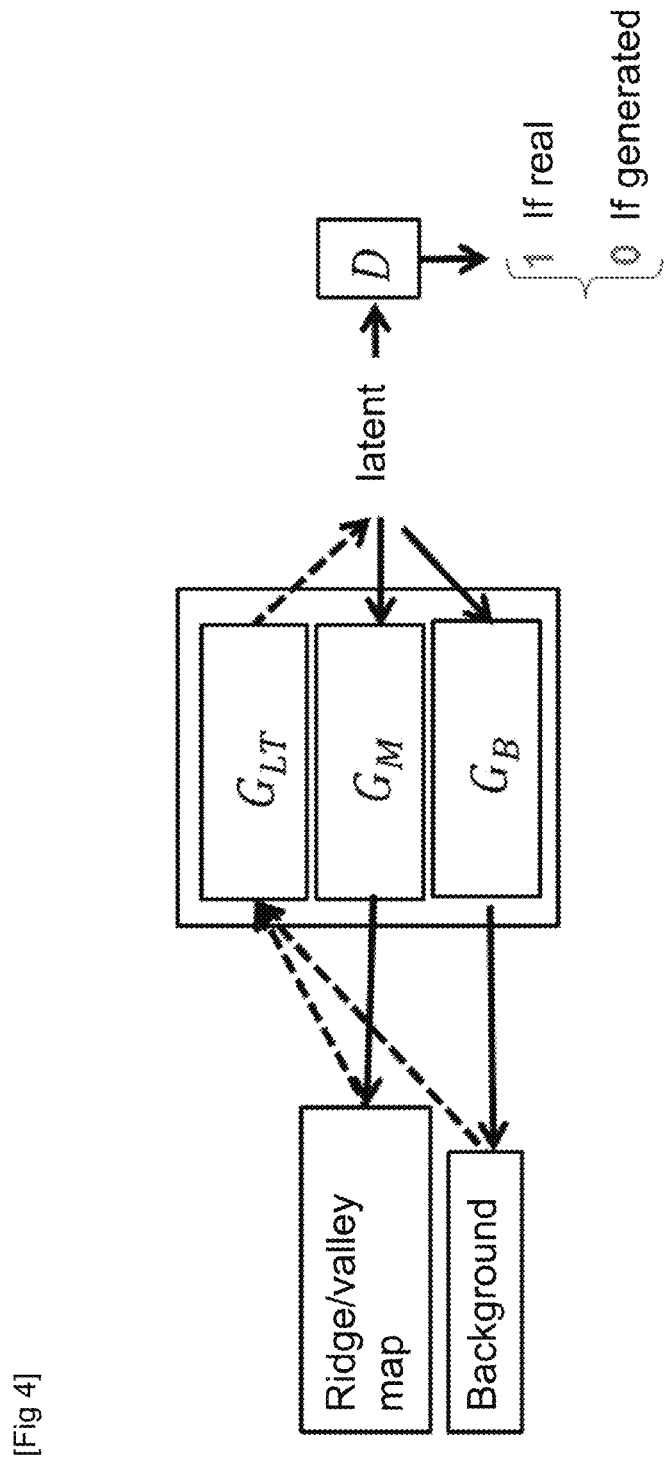
[Fig 4]

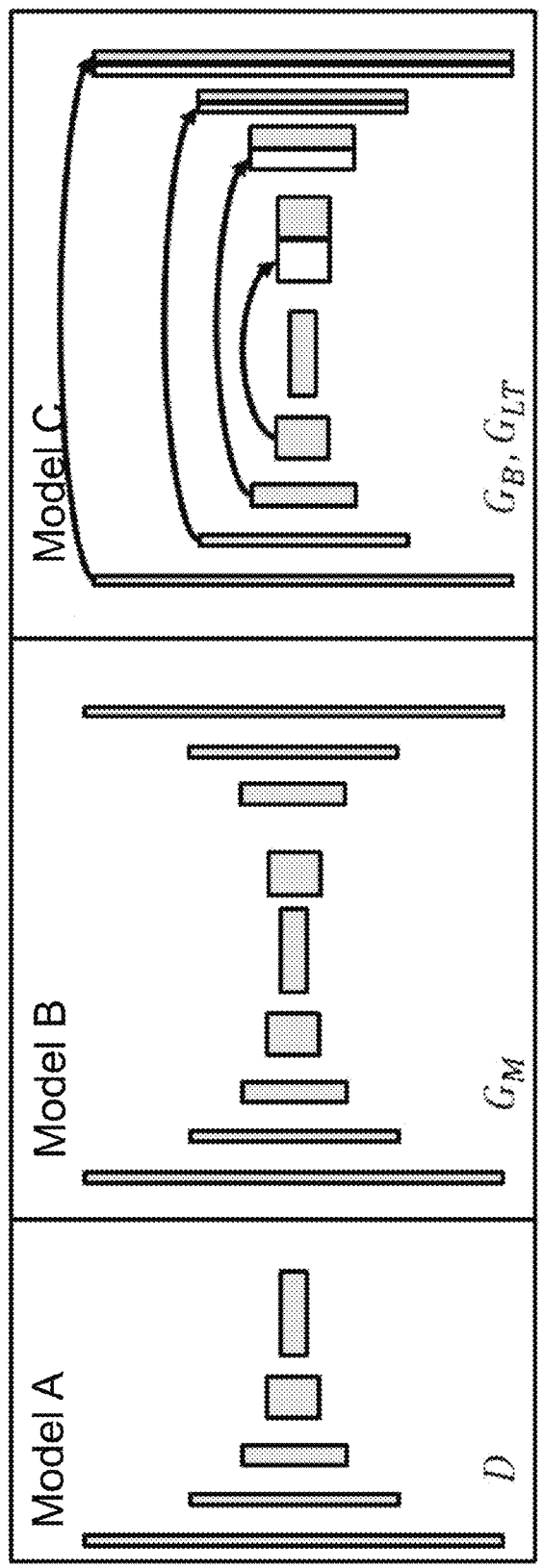
[Fig 5]

[Fig 6]
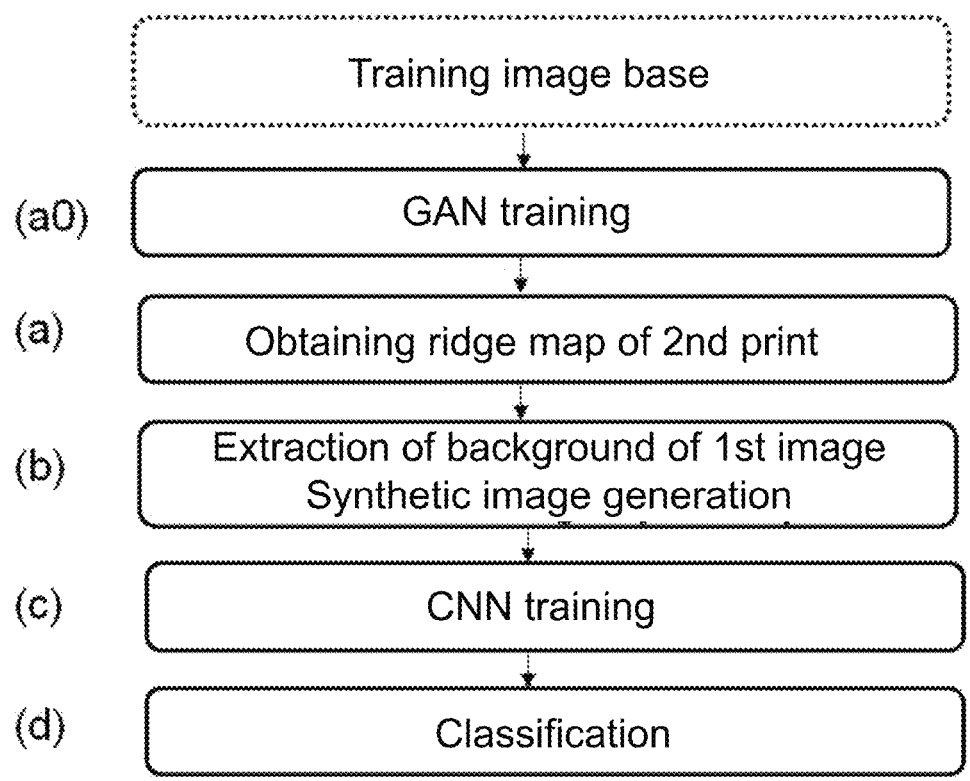

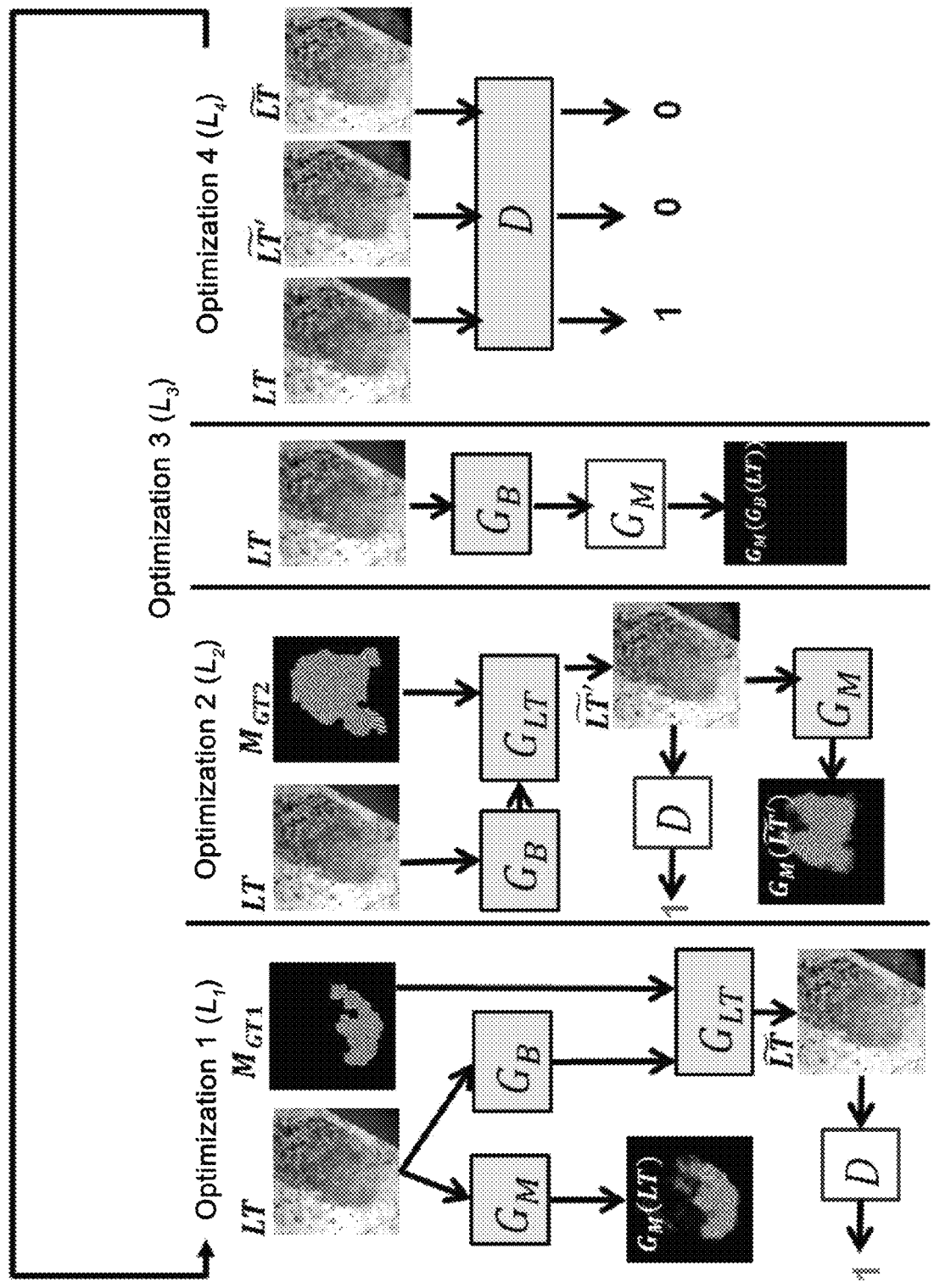
[Fig 7]

US 11,610,081 B2

METHOD FOR AUGMENTING A TRAINING IMAGE BASE REPRESENTING A PRINT ON A BACKGROUND BY MEANS OF A GENERATIVE ADVERSARIAL NETWORK

GENERAL TECHNICAL FIELD

The present invention relates to the field of biometrics, and proposes in particular a method for augmenting a training image base representing a print on a background by means of a generative adversarial network, as well as a method for training a convolutional neural network on the augmented training image base and a method for classifying an input image by means of the convolutional neural network.

STATE OF THE ART

Neural networks are massively used for data classification.

After an automatic training phase (generally supervised, meaning on an already classified reference database), a neural network "learns" and becomes capable on its own of applying the same classification to unknown data.

Convolutional neural networks (CNN) are a type of neural network wherein the connection pattern between neurons is inspired by the visual cortex of animals. They are thus particularly suited to a specific type of classification, which is image analysis; indeed they allow efficient recognition of people or objects in images or videos, in particular in security applications (e.g. automatic surveillance, threat detection, etc.).

Quite specifically, the use of CNNs is known in the field of biometric authentication/identification. In fact, a CNN can be trained to recognize an individual on the basis of biometric traits of this individual such as fingerprints (fingerprint recognition), iris or face (facial recognition). Insofar as these data are manipulated in image form, the CNN proves very effective.

Conventional biometric approaches use characteristic information of the biometric trait extracted from the acquired biometry, called features, and the training/classification is done on the basis of the comparison of these characteristics.

In particular, in the case of fingerprint recognition, fingertip images are processed so as to extract the features of a print that can be classified into three categories:
  Level 1 defines the general pattern of that print (one of four classes: right loop, left loop, arch and spiral), and the overall layout of the ridges (in particular, an orientation map called "Ridge Flow Matrix"—RFM map—is obtained, which represents the general direction of the ridge at each point of the print).
  Level 2 defines the particular points of the prints called minutia, which constitute "events" along the ridges (end of a ridge, bifurcation, etc.). The conventional recognition approaches essentially use these features.
  Level 3 defines more complex information such as the shape of the ridges, pores of the skin, scars, etc.

The method of extracting features from a print (in the form of feature maps) is called "encoding," which make it possible to compose a signature called "template" encoding the useful information in the final phase of classification. More specifically, classification will be done by comparing feature maps obtained with one or more reference feature maps associated with known individuals.

It would be desirable to avoid the encoding phase and go directly to performing the training/classification on the basis of biometric data, i.e. representing the biometrics by a reduced vector without the need to explicitly extract the features.

Recent approaches in the field of deep learning have made such major advances possible notably in the field of biometric print recognition, in particular fingerprints, and when they are acquired in a relatively standardized manner (for example on terminals of biometric systems). In contrast, there are difficulties with so-called latent prints, for example the fingerprints found at a crime scene. Two images of prints of the same identity can have strong rotations relative to each other, occultations as well as a set of distortions. In addition, latent prints generally have severe background noise and there is a risk that minutiae are identified erroneously on this background. In particular, the CNN require a greater volume of training data, as, indeed, the number of "real" latent print images available for training is very limited, all the more so since there are confidentiality problems related to the judicial nature of these images, preventing the sharing thereof.

Proposed in patent application FR1855170 is a particular increase of training data comprising the application of geometric and/or intensity transformations so as to create multiple "altered" occurrences of the input data.

This effectively improves the robustness to the deformations, but there still remains the problem of the background and it is desirable to further improve the performance.

Thus, it has been proposed to create new synthetic images by embedding isolated prints on backgrounds. In this respect, in the fields of video editing, "blending" mechanisms are known, performed either by a dedicated algorithm or by a CNN (see the document by H. Wu, S. Zheng, J. Zhang and K. Huang, *GP-GAN: Towards Realistic High-Resolution Image Blending, ACMM* 2019), making it possible to obtain synthetic composite images. However, it is noted that this blending only works for low-frequency elements, and if there were to be an attempt to implement it for latent print images, the synthetic images which would be generated would certainly appear similar to the real latent print images but, on the one hand, they would not in practice be perfectly natural and, on the other hand, the biometric content of the prints could be altered. Thus, they would, on the contrary, not improve the performance of the classification CNNs.

Consequently, it would be desirable to have a more effective training solution on the basis of image data representative of latent prints, of the parameters of a CNN for data classification by means of the CNN.

BRIEF DESCRIPTION OF THE INVENTION

According to a first aspect, the present invention relates to a method for augmenting a training image base representing a print on a background, characterized in that it comprises the implementation, by data processing means of a server, of steps of:
  (b) For at least a first image of said base, and a ridge map of a second print different from the print represented by said first image, generation by means of at least one generator sub-network of a generative adversarial network, GAN, of a synthetic image presenting the background of said first image and representing the second print.

According to advantageous and non-limitative characteristics:

the step (b) comprises the extraction of the background of said first image by means of a first generator sub-network of said GAN, then the generation of the synthetic image from the background extracted from the first image and from the ridge map of the second print by means of a second generator sub-network of said GAN.

The method comprises a step (a) of obtaining the ridge map of the second print from a second image representing said second print by means of a third generator sub-network of said GAN.

The method comprises a prior training step (a0) from said training image base of parameters of the at least one generator sub-network and of a discriminator sub-network of said GAN, antagonistically.

The step (a0) comprises, for at least one image of said training image base, said third image, the updating of the parameters of the at least one generator sub-network by minimizing for said third image at least one generator objective function, then the updating of the parameters of the discriminator sub-network by minimizing for said third image at least one discriminator objective function.

the step (a0) comprises, for each third image, the generation by the at least one generator sub-network of a synthetic version of the third image, and the assessment by the discriminator sub-network of whether the third image and/or the synthetic version of the third image is an original image of the training base or a synthetic image, the at least one generator objective function being representative of the error of the generator sub-network(s), and the at least one discriminator objective function being representative of the error of the discriminator sub-network.

A first generator objective function comprises at least a term representative of a distance between the third image and the synthetic version of the third image, and an null term if the discriminator sub-network incorrectly assesses that the synthetic version of the third image is an original image of the training base; and the discriminator objective function comprises at least one null term if the discriminator sub-network correctly assesses that the third image is an original image of the training base and an null term if the discriminator sub-network correctly assesses that the synthetic version of the third image is a synthetic image.

The step (a0) comprises, for each third image, the generation by the at least one generator sub-network of a synthetic image presenting the background of said third image and representing a fourth print different from the print represented by said third image, and the assessment by the discriminator sub-network of whether said synthetic image presenting the background of said third image and representing the fourth print is an original image of the training base or a synthetic image; a second generator objective function comprising at least an null term if the discriminator sub-network incorrectly assesses that said synthetic image presenting the background of said third image and representing the fourth print is an original image of the training base; and/or the discriminator objective function further comprises an null term if the discriminator sub-network correctly assesses that said synthetic image presenting the background of said third image and representing the fourth print is a synthetic image.

The step (a0) comprises, for each third image:

The extraction of the background of said third image by means of a first generator sub-network of the GAN, The generation by means of a second generator sub-network of the GAN,
of the synthetic version of the third image from the background extracted from the third image and from a ridge map of the print represented by the third image;
of the synthetic image presenting the background of said third image and representing the fourth print from the background extracted from the third image and from a ridge map of the fourth print.

Each image of the training base is associated with a reference ridge map of the print represented by this image, the step (a0) comprising, for each third image, obtaining by means of a third generator sub-network of said GAN:
a candidate ridge map of the third print from the third image;
a confirmatory ridge map of the fourth print from said synthetic image presenting the background of said third image and representing the fourth print;
the first generator objective function further comprising a term representative of a distance between the candidate ridge map of the third print and the reference ridge map associated with the third image; and/or the second generator objective function further comprising a term representative of a distance between the confirmatory ridge map of the fourth print and a reference ridge map associated with a fourth image of the training image base representing said fourth print.

The step (a0) comprises, for each third image, the obtaining by means of the third generator sub-network of a residual ridge map from the only background extracted from the third image; a third generator objective function comprising at least a term representative of a distance between said residual ridge map and a blank map.

The step (a0) sequentially comprises, for each third image, the updating of parameters:
of each generator sub-network by minimizing for said third image the first generator objective function,
of each generator sub-network by minimizing for said third image the second generator objective function,
of the only first generator sub-network by minimizing for said third image the third generator objective function, and
of the only discriminator sub-network by minimizing for said third image the discriminator objective function.

Said prints are biometric prints, in particular fingerprints.

According to a second aspect, a method is proposed for training parameters of a convolutional neural network, CNN, for classification of images representing a print on a background, comprising the implementation of the method according to the first aspect for augmenting a training image base representing a print on a background, said training images already being classified, then a step of:
(c) Training, from the already classified training image base augmented by at least said synthetic image presenting the background of said first image and representing the second print, of the parameters of said CNN According to a third aspect, a classification method is proposed for an input image, characterized in that it comprises the implementation of the method according to the second aspect for training parameters of a CNN, and then a step of:
(d) Classification, by means of the CNN, of said input image by data processing means of a client.

According to a fourth and a fifth aspect, a computer program product is proposed comprising code instructions for the execution of a method according to one of the first, second or third aspects for augmenting a training image base representing a print on a background, for training parameters of a convolutional neural network, CNN, or for the classification of an input image, when said program is executed on a computer; and a storage means readable by computer equipment on which a computer program product comprises code instructions for the execution of a method according to one of the first, second or third aspects for augmenting a training image base representing a print on a background, for training parameters of a convolutional neural network, CNN, or for the classification of an input image

DESCRIPTION OF THE FIGURES

Other characteristics and advantages of the present invention will appear upon reading the following description of a preferred embodiment. This description will be given with reference to the attached drawings in which:

FIG. 1 is a diagram of an architecture for implementation of the method according to the invention;

FIG. 2 illustrates the general operation of the method according to the invention;

FIG. 3 shows examples of synthetic images obtained during the implementation of the method according to the invention;

FIG. 4 shows in more detail the architecture of a GAN for the implementation of a preferred embodiment of the method according to the invention;

FIG. 5 shows examples of architecture of GAN sub-networks of FIG. 4;

FIG. 6 shows the steps of a preferred embodiment of the method according to the invention;

FIG. 7 shows the training of the GAN of FIG. 4 in a preferred embodiment of the method according to the invention.

DETAILED DESCRIPTION

Architecture

According to three complementary aspects of the invention, the following is proposed:
- a method for augmenting a training image base representing a print on a background;
- a method for training parameters of a convolutional neural network (CNN), to classify images representative of a print on a background, from the augmented training image base;
- a method for classifying an input image representative of a print on a background by means of said CNN.

As will be seen, the present augmentation method itself proposes both a parameter training method for a generative adversarial network (GAN), and the use of said GAN to generate a synthetic image.

The input or training data are image type data, and are representative of a print on a background, a so-called "latent print" (that is a print on top of a background visible in the image), as opposed to the so-called direct prints which are of good quality and isolated. In the remainder of this description, a print on a background will be referred to as latent print.

Background is understood to be textured graphics on which the print can be overprinted, often an item of furniture, a ticket, a weapon, a piece of paper, dishes, etc., in a manner which is difficult to separate. In other words, there may be some confusion between patterns from the print and background patterns. The background concept is the opposite of that of a plain ground: although it may be considered that a direct print is overprinted on plain white (see below), it is understood that, obviously, the print becomes easily detached and there is no problem isolating it using any segmentation algorithm, which is not the case for a latent print.

Print is understood to be a "trace" and generally any structured content composed of ridges and valleys (generally binary, i.e. in black and white), which may be overprinted on the background, and in particular a biometric print or biometric trait (advantageously selected from a digital print, a palm print, a retinal scan, etc.), i.e. a trait uniquely associated with an individual. Preferably, said biometric print is a fingerprint and this example will be used in the remainder of the description (as shall be seen, the present method is especially effective in particular in the case of latent fingerprints), but it is understood that the present method is not limited to this particular case nor even to biometric prints: the print may, for example, be a more generic print still of forensic value, like a footprint, a tire print, a gun barrel print on a bullet (scratches), but also an individual's handwritten signature, printed characters (the background being for example, a guilloche, that is a set of interlaced lines constituting a security feature of an identity document or a bank note), or even musical notes on a score, etc.

The present methods are implemented within an architecture such as shown in FIG. 1, with a server 1 and a client 2. The server 1 is the training device (implementing the augmentation method and, if appropriate, the method for training a CNN) and the client 2 is a classification device (implementing any classification method using the CNN), for example a user terminal. It is entirely possible that the two devices 1, 2 are the same. In addition, the concept of server 1 may, in fact, encompass several servers, insofar as it is entirely possible for example that the parameters of the GAN and of the CNN are trained in practice by different entities sharing the training image base.

In any case, each device 1, 2 is typically a remote computer equipment connected to an extended network 10 such as the Internet for the exchange of data. Each comprises data processing means 11, 21 of processor type and data storage means 12, 22 such as computer memory, for example a drive.

The server 1 stores a training data base, that is a set of training images, representing a print on a background, in practice already classified (and/or preferentially for which there is already a ridge map of the print represented by the image called the reference ridge map, considered to be the ground truth, for example obtained by the prior application of an algorithm dedicated to image analysis on each training image), as opposed to images called input images which are precisely those to be classified. These training images represent a print on a background. It should be noted that for the method of augmenting the database only, it is not, in practice, necessary for the training images to be classified. Regarding the reference ridge maps that are optionally associated with the training images, they enable more effective training but are not mandatory.

In the preferred case of a biometric print (but also in the case where, for example, the print is a signature) said classification is therefore generally recognition of the user (authentication or identification of the individual by recognition of their biometric print), and therefore each already classified training image is associated with the corresponding identity. Conventionally, such a training data base comprises, as far as possible, several representative images of a single print, i.e. associated with the same identity, for example several occurrences of the same fingerprint, but acquired in a slightly different manner and if possible with different backgrounds.

GAN

A generative adversarial network or GAN is a type of artificial neural network comprising sub-networks competing in a game theory scenario. At least one sub-network is called the "generator"; it generates a sample (for example an image), whereas its adversary, a sub-network called the "discriminator", tries to detect whether a sample is real or indeed whether it is the result of the generator.

The present method for augmenting a training image base representing a print on a background proposes, in this respect, to use a GAN to generate synthetic images of prints on a background which are as natural as those of the training image base.

The idea is not to start from any background but from a training image, for which the GAN will "replace" the print. More specifically, with reference to FIG. 2, based on a first image of said base (representing a first print on a first background), if appropriate selected randomly, the GAN generates a synthetic image presenting the background of said first image and representing a second print, that is representing the second print on the first background. The second print differs from the first print and, as will be seen, is in particular defined by its ridge map (also called a "ridge and valley" map), which corresponds in practice to a binary image isolating the ridges of a print (the space between two ridges constituting a valley).

Examples of such synthetic images are represented in FIG. 3 with the backgrounds and prints used.

It should be noted that the GAN may use as an input either directly the ridge map of the second print (particularly if there is a training base associating a ridge map to each image—it is sufficient therefore to use a second image and to take the associated map), or a second image representing the second print if appropriate on a background, by extracting the ridge map of the print represented.

Alternatively, as represented by FIG. 2, the second print may, moreover, itself be completely synthetic (which entirely resolves the problems of confidentiality) and for example generated as a function of an input vector (itself potentially generated randomly). Methods for generating completely synthetic fingerprints are known from the state of the art, see, for example, the document by R. Cappelli, M. Ferrara and D. Maltoni, "*Generating synthetic fingerprints*", in Martin Drahanský *Hand-Based Biometrics: Methods and technology, IET,* 2018.

Thus, the idea is to use at least one generator sub-network of the GAN (and preferentially two or even three, referenced $G_B$, $G_M$, $G_{LT}$ with reference to FIG. 4, to which subsequent reference will be made) in order to generate synthetic images of prints on a background whereas a discriminator sub-network of said GAN (referenced D) attempts to distinguish the synthetic images from the training images (originating from the base).

The generator sub-networks may be the following:

First generator sub-network $G_B$: a block for extracting the background of an image representing a print on a background. As will be seen, this sub-network almost always uses as an input a training image (particularly the first image, for extraction from the first background), that is a real image.

Second generator sub-network $G_{LT}$: the main block for generating a synthetic image from a background and from a ridge map.

Third generator sub-network $G_M$: an optional block for extracting from the ridge map a print from an image representing this print, generally on a background. Again, most of the time this sub-network uses a training image as an input, but possibly a direct print image (particularly the second image, for extraction from the second print), insofar as the extraction of a print on a plain background is even easier than on a textured background. If appropriate, the term "candidate" refers to a ridge map of a print extracted from a training image, in order to differentiate it from the "reference" ridge map such as associated with this training image in the base.

The discriminator sub-network D uses as an input an image of a print on a background and returns a Boolean (or a value 0 or 1) depending on whether it considers that the image is synthetic (that is i.e. generated by the second generator sub-network $G_{LT}$) or real (i.e. originating from the training base). It should be noted that this discriminator sub-network may only be used when training the parameters of the GAN, and not during its conventional use for augmenting the training base.

Each of the generator sub-networks $G_B$, $G_M$, $G_{LT}$ or discriminator sub-networks D is preferentially a CNN (insofar as it is recalled that the CNNs are particularly suited to image processing), but may have one of a number of architectures.

Referring to FIG. 5:

the discriminator sub-network D may, for example, be of encoder type (model A), advantageously with an encoder with internal residual connections, such as a ResNet, but also an AlexNet or even a DenseNet (dense network presenting all possible residual connections);

the third generator sub-network $G_M$ may, for example, be of encoder-decoder type (model B), the same encoders as for the discriminator sub-network D may be used;

the first and second generator sub-networks $G_B$, $G_{LT}$ may, for example, be of encoder-decoder type again, particularly with residual connections between the encoder and the decoder in order to conserve the high-frequency features of the background (model C), the assembly being preferentially of U-Net type.

It should be recalled that the encoders are typically composed of several layers of convolution, non-linear activation, normalization and pooling. The decoders themselves are typically composed of deconvolution or scaling layers and activation layers (ReLU, TanH, etc.).

Method of Augmentation

Referring to FIG. 6, the method for augmenting a training image base representing a print on a background, implemented by the data processing means 11 of the server 1, advantageously starts with a step (a) of obtaining the ridge map of the second print from a second image representing said second print by means of a third generator sub-network $G_M$ of said GAN.

As explained, the second image may be an image representing just the second print as a direct print, but also another image of the training base (i.e. representing the second print on a second background—the synthetic image then corresponds to the "fusion" of two training images). In the case that the second print is a direct print, it can as explained be a synthetic print generated from a vector. It should be noted that it is still possible to generate the ridge map of the second print directly from a vector, without it being necessary to use the third generator sub-network $G_M$, or even to directly use the ridge map associated with the second image if the training base is constituted in that way.

Then, in a main step (b), for at least a first image of said base, and a ridge map of the second print different from the print represented by said first image, the generator sub-network(s) $G_B$, $G_M$, $G_{LT}$ generate the synthetic image presenting the background of said first image and representing the second print.

Preferably, the step (b) comprises the extraction of the background of said first image by means of the first generator sub-network $G_B$, then the generation of the synthetic image from the background extracted from the first image and from the ridge map of the second print by means of the second generator sub-network $G_{LT}$.

The step (b) may comprise testing of the synthetic image by means of the discriminator sub-network D: if the synthetic image is determined as generated by the second generator sub-network $G_{LT}$, it is rejected (i.e. it is only kept if it is determined to be real, that is that it succeeds in deceiving the discriminator sub-network D).

It should be noted that the step (b) may be repeated multiple times, so as to generate a large number of synthetic images, which may be incorporated into the training base. It should be noted that if the training images are already classified, the "class" associated with the synthetic image to be able to incorporate it in the training base (i.e. the corresponding identity) is that of the second print.

Training the GAN

Advantageously, the method starts with a training step (a0), by the data processing means 11 of the server 1, from said training image base, of the GAN parameters, i.e. of parameters of the at least one generator sub-network $G_B$, $G_M$, $G_{LT}$ and of the discriminator sub-network D, antagonistically.

Conventionally, the parameters of the at least one generator sub-network $G_B$, $G_M$, $G_{LT}$ and of the discriminator sub-network D are updated by minimizing for at least one given image of the training image base (referred to as third image, said third image representing, like the others, a third print on a third background, in particular chosen randomly—it is understood that it may still actually be the first or the second image, all the more so since in practice the training uses a large number of images of the training base) at least one objective function $L_1$, $L_2$, $L_3$, $L_4$. Conventionally, each objective function is representative of the performance of all or part of the sub-networks $G_B$, $G_M$, $G_{LT}$ and D for a third image, it will subsequently be seen how a third image is processed.

As explained, "antagonistically" means that the generator sub-networks $G_B$, $G_M$, $G_{LT}$ and the discriminator sub-network D are in competition: the generator sub-networks $G_B$, $G_M$, $G_{LT}$ are attempting to deceive the discriminator sub-network D, and the discriminator sub-network D is attempting not to be deceived by the generator sub-networks $G_B$, $G_M$, $G_{LT}$. Thus, there is generally at least one generator objective function $L_1$, $L_2$, $L_3$, which is representative of the error of the generator sub-network or sub-networks $G_B$, $G_M$, $G_{LT}$, i.e. it presents that much higher a value when the generator sub-networks $G_B$, $G_M$, $G_{LT}$ fail to deceive the discriminator sub-network D; and at least one discriminator objective function $L_4$, which is representative of the error of the discriminator sub-network D, i.e. it gives a value that much higher when the generator sub-networks $G_B$, $G_M$, $G_{LT}$ manage to deceive the discriminator sub-network D.

The training of the GAN of the step (a0) is preferably cyclical, which means that one cycle is repeated for each third image used, a cycle wherein the parameters of the at least one generator sub-network $G_B$, $G_M$, $G_{LT}$ and the parameters of the discriminator sub-network D are not trained simultaneously: in a so-called generator phase of the cycle, the parameters of the at least one generator sub-network $G_B$, $G_M$, $G_{LT}$ are updated by minimizing the at least one generator objective function $L_1$, $L_2$, $L_3$ (the parameters of the discriminator sub-network D are not updated), and in a so-called discriminator phase of the cycle, the parameters of the discriminator sub-network D are updated by minimizing the discriminator objective function $L_4$ (the parameters of the generator sub-network or sub-networks $G_B$, $G_M$, $G_{LT}$ are not updated).

More specifically, at each cycle (i.e. for each third image), each phase is sequentially implemented. It should be noted that each phase may comprise, in practice, several sub-phases of updates using several objective functions, and if appropriate only updating the parameters of some of the sub-networks concerned).

In practice, in the preferred embodiment of FIG. 7 which will subsequently be described in detail, there are three generator objective functions $L_1$, $L_2$, $L_3$ and one discriminator objective function $L_4$ (as many as there are sub-networks), and the generator phase comprises three sub-phases (one for each generator objective function $L_1$, $L_2$, $L_3$). In other words, the step (a0) iterates for a third image on four different and competing optimizations. As will be seen, the first optimization is advantageously supervised, namely, that for a third image, its associated reference ridge map is needed. The other three optimizations do not require any additional annotation.

This approach makes it possible to use considerably more training images during training, thus reducing the time-consuming annotation work.

Each cycle therefore sees the sub-networks $G_B$, $G_M$, $G_{LT}$ and D working on a third image, then the objective function or functions $L_1$, $L_2$, $L_3$, $L_4$ are applied.

Referring to FIG. 3, the step (a0) preferentially comprises, for each third image (i.e. for each cycle), the extraction of the background of the third image (the third background) by means of the first generator sub-network $G_B$, and the generation of a "synthetic version" of the third image from the background extracted from the third image and from a ridge map of the print represented by the third image (the third print) by means of the second generator sub-network $G_{LT}$. Said ridge map of the print represented by the third image is either the reference map associated in the training base with the third image, or the candidate map obtained from the third image by means of the third generator sub-network $G_M$.

It is understood therefore that said synthetic version of the third image presents the background of said third image and represents the print of said third image, i.e. constitutes a reconstruction of the third image. In other words, if the generator sub-networks $G_B$, $G_M$, $G_{LT}$ were perfect, the synthetic version of the third image would be identical to the original third image (and the ridge map optionally obtained from the third print would be identical to the reference map).

Insofar as the training is antagonistic, the step (a0) also comprises the assessment by the discriminator sub-network D of whether the third image and/or the synthetic version of the third image is an original image of the training base or a synthetic image, i.e. if it is real or not. In other words, if the discriminator sub-network D was perfect, it would always answer that the third image is an original image of the training base and that the synthetic version of the third image is a synthetic image.

Advantageously, the step (a0) also comprises in the same cycle (for the third image), the generation by the at least one generator sub-network $G_B$, $G_M$, $G_{LT}$ of a synthetic image presenting the background of said third image and representing a fourth print different from the print represented by said third image (typically in the same way as for the first image: the second generator sub-network $G_{LT}$ generates this synthetic image presenting the background of said third image and representing the fourth print from the background extracted from the third image and from a ridge map of the fourth print, in particular either a reference map associated in the training base with a fourth image different from the third image and representing the fourth print, or the candidate map obtained from this fourth print by means of the third generator sub-network $G_M$).

Again, due to its antagonistic character, the training therefore comprises the assessment by the discriminator sub-network D of whether said synthetic image presenting the background of said third image and representing the fourth print is an original image of the training base or a synthetic image. It is understood that if the discriminator sub-network D was perfect, it would always answer that this synthetic image presenting the background of said third image and representing the fourth print is a synthetic image.

In practice, the discriminator sub-network D responds to an image which itself is subject to it "1" or "0" according to whether it assesses it as real or synthetic. By calculating the standard for the output of the discriminator sub-network D minus the expected value 1 or 0, it is possible to estimate its error.

As will subsequently be seen, the third generator sub-network $G_M$ can, moreover, be used to generate a so-called confirmatory ridge map of the fourth print from said synthetic image presenting the background of said third image and representing the fourth print. More specifically, having "inserted" the fourth print on the third background, it is possible to re-extract its ridge map and see whether the fourth print has indeed been conserved from the reference map, hence the name confirmatory map. Indeed, assuming that the synthetic image presenting the background of said third image and representing the fourth print is generated successfully, exactly the same print content should be found.

Furthermore, the obtaining of the third generator sub-network $G_M$ may, moreover, be used to obtain a so-called residual ridge map from the only background extracted from the third image. More specifically, the third generator sub-network $G_M$ is applied directly to the third background only and not to the third image. Normally, the background should be devoid of any print (which has already been extracted) in order to check that there are no more prints to extract: a blank map should be found, hence the name residual map.

The pairing is presently noted $(LT, M_{LT})$ of a third image from the training base and of its associated reference ridge map (to be differentiated from the candidate ridge map obtained via the third sub-network, i.e. $G_M(LT)$) and $(LT', M_{LT}')$ another pairing of said fourth image from the training base and of its associated reference ridge map (also to be differentiated from the candidate ridge map of the fourth print obtained via the third sub-network, i.e. $G_M(LT')$), advantageously randomly selected in the training base. $\underline{LT} = G_{LT}(M_{LT}, G_B(LT))$ is noted to be the synthetic version of the third image generated from the background $G_B(LT)$ of the third image LT and from its associated reference map $M_{LT}$. As explained, it may also be generated from the candidate map $G_M(LT)$.

Finally, $\underline{LT'} = G_{LT}(M_{LT}', G_B(LT))$ is the synthetic image generated from the background $G_B(LT)$ of the third image LT and from the reference map of the fourth print $M_{LT}'$ different from the reference map $M_{LT}$ associated with the third image LT. Once again, it may also be generated from the candidate map $G_M(LT')$. It is desirable that:

$\underline{LT}$ coincides as much as possible with LT; and
$\underline{LT'}$ has the print of LT' with the background of LT.

As explained, at least one generator objective function $L_1$, $L_2$, $L_3$ being representative of the error of the generator sub-network(s) $G_B$, $G_M$, $G_{LT}$ is defined, each expressed as a sum of positive terms: each term must be minimized to minimize the entire objective function.

A first generator objective function $L_1$ preferentially of the form $L_1 = \lambda_{11}L_{11} + \lambda_{12}L_{12} + \lambda_{D1}L_{D1}$) (with two or three terms, with $\lambda_{11}, \lambda_{12}$ and $\lambda_{D1}$ being constants) comprises at least one term ($L_{12} = \|LT - \underline{LT}\|$) representative of a distance between the third image LT and its synthetic version $\underline{LT}$, and an null term ($L_{D1} = \|D(\underline{LT}) - 1\|$) if the discriminator sub-network D incorrectly assesses (erroneously) that the synthetic version $\underline{LT}$ of the third image is an original image of the training base (i.e. if the discriminator sub-network D returns "1" whereas it should have returned "0" since the synthetic version $\underline{LT}$ of the third image is in reality a synthetic image).

Advantageously, if the reference ridge map of the third print $M_{LT}$ is available, the first generator objective function $L_1$ further comprises a term ($L_{11} = DSC[M_{LT}, G_M(LT)]$) representative of a distance between the candidate ridge map of the third print $G_M(LT)$ and the reference ridge map $M_{LT}$ associated with the third image. DSC corresponds to the Sorensen-Dice coefficient, but it is possible to use other standards.

Minimizing the term $L_{11}$ obliges the candidate map $G_M(LT)$ generated by $G_M$ to be similar to the reference map. With the term $L_{12}$, the synthetic version $\underline{LT}$ of the third image generated from its background $G_B(LT)$ and from its ridge map $M_{LT}$ must be similar to the third image LT. Finally, $G_{LT}$ is forced via $L_{D1}$ to generate realistic images by attempting to deceive the discriminator sub-network D with $\underline{LT}$ (D must respond with 1).

A possible second generator objective function $L_2$, preferentially of the form $L_2 = \lambda_{21}L_{21} + \lambda_{D2}L_{D2}$ (with one or two terms, with $\lambda_{21}$ and $\lambda_{D2}$ being constants) comprises at least one null term ($L_{D1} = \|D(\underline{LT'}) - 1\|$) if the discriminator sub-network D incorrectly assesses (erroneously) that said synthetic image $\underline{LT'}$ presenting the background of said third image and representing the fourth print is an original image from the training base (i.e. if the discriminator sub-network D returns "1" whereas it should have returned "0" since said synthetic image $\underline{LT'}$ is in reality a synthetic image).

Advantageously, if the reference ridge map of the fourth print is available, the second generator objective function $L_1$ further comprises a term ($L_{21} = DSC[M_{LT}', G_M(\underline{LT'})]$) representative of a distance between the confirmatory ridge map of the fourth print $G_M(\underline{LT'}) = G_M(G_{LT}(M_{LT}', G_B(LT)))$ and the reference ridge map $M_{LT}'$ associated with the fourth image (representing said fourth print). As explained, the confirmatory ridge map of the fourth print constitutes a "reconstruction" of the reference ridge map of the fourth print.

Minimizing $L_{21}$ obliges this confirmatory ridge map generated by $G_M$ to be similar to the ridge map used to generate the synthetic image. The model is thus forced to separate content of the background and content of the print. Via this term, a loop is created and it is a means of obliging $G_{LT}$ to correctly conserve the reference ridge map $M_{LT}'$ input to $G_{LT}$ and also to oblige the separation between print and background as the third print of LT must not be found in $\underline{LT'}$ (i.e. $M_{LT}$). Finally, as for the first generator objective function $L_1$, $G_{LT}$ is forced via $L_{D1}$ to generate realistic prints by attempting to deceive the discriminator with $\underline{LT'}$ (D must respond with 1).

A possible third generator objective function $L_3$ comprises at least one (and preferentially only one) term $\lambda_3\|G_M(G_B(LT))\|$ representative of a distance between said residual ridge map $G_M(G_B(LT))$ (ridge map of the background only $G_B(LT)$) and a blank map (i.e. a blank image, which is why this distance is, in practice, the simple standard for the residual map). Once again $\lambda_3$ is a constant.

The separation of the image between print and content other than the print (background) is forced here, i.e. the background must not have ridges or valleys.

It should be noted that it is still possible to use the three aforementioned generator objective functions $L_1$, $L_2$, $L_3$ without having reference ridge maps; it is sufficient to omit the first terms $L_{11}$ and $L_{21}$ and to generate LT and LT' from candidate ridge maps $G_M(LT)$ and $G_M(LT')$ obtained from the third and fourth images. However, knowledge of the ground truths remains preferable as it enables the parameters of the third generator sub-network $G_M$ to converge much more successfully and more quickly. In a particularly preferred manner, it is possible to alternate, and in particular occasionally use $G_M(LT)$ in an emergency situation if, for a third image, the associated reference ridge map $M_{LT}$ was missing or manifestly false: this makes it possible to continue the training in the knowledge that the parameters of the third generator sub-network $G_M$ have already converged correctly and that $G_M(LT)$ is already a very good approximation of $M_{LT}$.

In all cases, it is not intended that the present invention will be limited to any combination of generator objective functions.

As regards the discriminator objective function $L_4$, there is advantageously just one, preferentially of the form $L_4=\lambda_{D41}\|D(LT)-1\|+\lambda_{D42}\|D(\underline{LT})\|+\lambda_{D43}\|D(\underline{LT'})\|$ (with two or three terms, with $\lambda_{D41}$, $\lambda_{D42}$ and $\lambda_{D43}$ being constants). This discriminator objective function $L_4$ thus comprises at least one null term ($\|D(LT)-1\|$) if the discriminator sub-network D correctly assesses that the third image LT is an original image from the training base and an null term ($\|D(\underline{LT})\|$) if the discriminator sub-network D correctly assesses that the synthetic version $\underline{LT}$ of the third image is a synthetic image.

Advantageously, the discriminator objective function $L_4$ further comprises an null term ($\|D(LT')\|$) if the discriminator sub-network D correctly assesses that said synthetic image LT' presenting the background of said third image and representing the fourth print is a synthetic image.

Thanks to this discriminator objective function, the discriminator sub-network D is trained to discriminate between real images and synthetic images. The output of the discriminator D must be 1 for the real image LT and 0 for the generated images $\underline{LT}$ and $\underline{LT'}$. The adversarial nature is clearly seen as here a correct assessment is sought, whereas in the first and second objective functions $L_1$, $L_2$, an incorrect assessment was sought.

Once again, the person skilled in the art can use any other discriminator objective function.

As explained, the step (a0) preferentially comprises a succession of phases/sub-phases and in particular a cyclical alternation of generator phase and discriminator phase such that there is no imbalance between the generator sub-networks $G_B$, $G_M$, $G_{LT}$ and the discriminator sub-network D: the two types of sub-networks must progress at the same rate for the training to be effective.

Thus, in the embodiment of FIG. 7, for each third image, there is a sequential update of the parameters (in FIG. 7, only the parameters of the shaded sub-networks are updated, the others are fixed):

of each generator sub-network $G_B$, $G_M$, $G_{LT}$ by minimizing for said third image the first generator objective function $L_1$ noted as optimization 1 of each generator sub-network $G_B$, $G_M$, $G_{LT}$ by minimizing for said third image the second generator objective function $L_2$ noted as optimization 2, of the only first generator sub-network $G_B$ by minimizing for said third image the third generator objective function $L_3$, noted as optimization 3, and of the only discriminator sub-network D by minimizing for said third image the discriminator objective function $L_4$.

Therefore the sequence is optimization 1=> optimization 2=> optimization 3=>optimization 4. Once the fourth optimization has been performed, optimization 1 is returned to (for another third image) until the sub-networks converge.

It should be noted that it is possible to envisage other sequences, for example a discriminator phase after each generator sub-phase, i.e. optimization 1=> optimization 4=> optimization 2=> optimization 4=> optimization 3=> optimization 4=>optimization 1, etc. It is possible to adjust the constants of the objective functions as a consequence.

Training the CNN and Classification

At the end of the step (b), an "augmented" training image base of said synthetic images is available, meaning that it now comprises, besides the original copies of the training images, the synthetic images that have been generated from the latter. In other words, the size of the training database has been increased: in the example of FIG. 2, six synthetic images were generated using three training images (from which the backgrounds originate).

If said training images are already classified, it is possible to train the parameters of the convolutional neural network, CNN, to classify images representing a print on a background. It is assumed in this regard, as explained, that if a synthetic image presenting the background of a first image and representing a second print is added to the base, its classification is the same as that of the second image representing the second print.

In this regard, the invention relates, according to a second aspect, to a method for training the parameters of a CNN comprising the implementation of the method for augmenting a training image base (which images are already classified) representing a print on a background according to the second aspect (steps (a) and (b)), then the implementation of a step (c), from said augmented training images already classified, the server 1 learns the parameters of a classification CNN conventionally.

The trained classification CNN can be stored if appropriate on data storage means 12 of the client 2 for classification use.

It will be understood that the synthetic images are not necessarily stored in the training image base when they are generated: it is possible to generate them on the fly, or even concurrently with step (c). Thus the synthetic images are "single use," meaning that the original training base is augmented randomly and infinitely without calling for further storage.

According to a third aspect, the invention relates to a classification method of an input image (in particular an image representing a biometric print for which the associated identity is to be determined on a background) comprising the implementation of the training method for a CNN according to the second aspect (steps (a), (b) and (c)), then the implementation of a classification step (d) of said input image by means of the CNN by data processing means 21 of the client 2

This step (c) is implemented as explained conventionally; it is just understood that the CNN has been trained on a larger and more realistic training image base and consequently has improved operating performance.

The qualitative assessment has made it possible to check the superior quality of the synthetic images generated in relation to the known techniques.

Preservation of the classification (i.e. of the biometric identity if the prints are biometric prints) has also been validated quantitatively. For this assessment, synthetic images of latent prints $LT_G$ have been generated from the biometric content of direct prints of good quality TP (used as second images) and from the background of real latent print images $LT_R$ (used as first images), in accordance with the steps (a) and (b) of the described augmentation method, i.e. $LT_G = G_{LT}[G_M(TP), G_B(LT_R)]$.

The identification accuracy of the latent print images generated was able to be assessed against a noise base of 100000 prints and against direct prints TP used for their biometric content. The classification accuracy obtained is 100% (in other words, each synthetic image of latent prints $LT_G$ was always identified as associated with the identity of the original direct print TP) which shows that the biometric content is conserved in the synthetic images of latent prints generated by the current GAN and that the biometric content of the real latent print images $LT_R$ had indeed been eliminated.

Computer Program Product

According to a fourth and a fifth aspects, the invention relates to a computer program product comprising code instructions for the execution (in particular on data processing means 11, 21 of the server 1 and/or of the client 2) of a method according to the first, second or third aspect for augmenting a training image base representing a print on a background, for training parameters of a convolutional neural network, CNN, or for classification of an input image, as well as storage means readable by computer equipment (a memory 12, 22 of the server 1 and/or of the client 2) on which this computer program product is located.

The invention claimed is:

1. A method for augmenting a training image base representing a print on a background, comprising the implementation, by data processing means of a server:
for at least a first image of said base, and a ridge map of a second print different from the print represented by said first image, generating by at least one generator sub-network ($G_B$, $G_M$, $G_{LT}$) of a generative adversarial network, GAN, a synthetic image presenting the background of said first image and representing the second print.

2. The method according to claim 1, wherein the generating comprises the extraction of the background of said first image by a first generator sub-network ($G_B$) of said GAN, then generating the synthetic image from the background extracted from the first image and from the ridge map of the second print by a second generator sub-network ($G_{LT}$) of said GAN.

3. The method according to claim 2, comprising obtaining the ridge map of the second print from a second image representing said second print by a third generator sub-network ($G_M$) of said GAN.

4. The method according to claim 1, comprising a prior training step (a0) from said training image base of parameters of the at least one generator sub-network ($G_B$, $G_M$, $G_{LT}$) and a discriminator sub-network (D) of said GAN, antagonistically.

5. The method according to claim 4, wherein the step (a0) comprises, for at least one image of said training image base, a third image, updating the parameters of the at least one generator sub-network ($G_B$, $G_M$, $G_{LT}$) by minimizing for said third image at least one generator objective function ($L_1$, $L_2$, $L_3$), then updating the parameters of the discriminator sub-network (D) by minimizing for said third image at least one discriminator objective function ($L_4$).

6. The method according to claim 5, wherein the step (a0) further comprises, for each said third image, generating by the at least one generator sub-network ($G_B$, $G_M$, $G_{LT}$) a synthetic version of the third image, and an assessment by the discriminator sub-network (D) of whether the third image and/or the synthetic version of the third image is an original image of the training base or a synthetic image, the at least one generator objective function ($L_1$, $L_2$, $L_3$) being representative of the error of the generator sub-network(s) ($G_B$, $G_M$, $G_{LT}$), and the at least one discriminator objective function ($L_4$) being representative of the error of the discriminator sub-network (D).

7. The method according to claim 6, wherein a first generator objective function ($L_1$) comprises at least a term representative a distance between the third image and the synthetic version of the third image, and a null term if the discriminator sub-network (D) incorrectly assesses that the synthetic version of the third image is an original image of the training base; and the discriminator objective function ($L_4$) comprises at least one null term if the discriminator sub-network (D) correctly assesses that the third image is an original image of the training base and/or an null term if the discriminator sub-network (D) correctly assesses that the synthetic version of the third image is a synthetic image.

8. The method according to claim 7, wherein the step (a0) further comprises, for each said third image, the generation by the at least one generator sub-network ($G_B$, $G_M$, $G_{LT}$) a synthetic image presenting the background of said third image and representing a fourth print different from the print represented by said third image, and the assessment by the discriminator sub-network (D) of whether said synthetic image presenting the background of said third image and representing the fourth print is an original image of the training base or a synthetic image; a second generator objective function ($L_2$) comprising at least a null term if the discriminator sub-network (D) incorrectly assesses that said synthetic image presenting the background of said third image and representing the fourth print is an original image of the training base; and/or the discriminator objective function ($L_4$) further comprising a null term if the discriminator sub-network (D) correctly assesses that said synthetic image presenting the background of said third image and representing the fourth print is a synthetic image.

9. The method according to claim 8, wherein the step (a0) further comprises, for each said third image:
extracting the background of said third image by a first generator sub-network ($G_B$) of the GAN,
generating by a second generator sub-network ($G_{LT}$) of the GAN,
the synthetic version of the third image from the background extracted from the third image and from a ridge map of the print represented by the third image;
the synthetic image presenting the background of said third image and representing the fourth print from the background extracted from the third image and from a ridge map of the fourth print.

10. The method according to claim 9, wherein each image of the training base is associated with a reference ridge map of the print represented by said image, the step (a0) further comprising, for each said third image, obtaining by a third generator sub-network ($G_M$) of said GAN:
- a candidate ridge map of the third print from the third image;
- a confirmatory ridge map of the fourth print from said synthetic image presenting the background of said third image and representing the fourth print;
- the first generator objective function ($L_1$) further comprising a term representative a distance between the candidate ridge map of the third print and the reference ridge map associated with the third image; and/or the second generator objective function ($L_2$) further comprising a term representative a distance between the confirmatory ridge map of the fourth print and a reference ridge map associated with a fourth image of the training image base representing said fourth print.

11. The method according to claim 10, wherein the step (a0) further comprises, for each said third image, obtaining by the third generator sub-network ($G_M$) a residual ridge map from the only background extracted from the third image; a third generator objective function ($L_3$) comprising at least a term representative a distance between said residual ridge map and a blank map.

12. The method according to claim 11, wherein the step (a0) sequentially further comprises, for each said third image, updating of the parameters:
- of each generator sub-network ($G_B$, $G_M$, $G_{LT}$) by minimizing for said third image the first generator objective function ($L_1$),
- of each generator sub-network ($G_B$, $G_M$, $G_{LT}$) by minimizing for said third image the second generator objective function ($L_2$),
- of the only first generator sub-network ($G_B$) by minimizing for said third image the third generator objective function ($L_3$), and
- of the only discriminator sub-network (D) by minimizing for said third image the discriminator objective function ($L_4$).

13. The method according to claim 1, wherein said prints are biometric prints.

14. A method for training parameters a convolutional neural network, CNN, for classification of images representing a print on a background, comprising the implementation of the method according to claim 1 for augmenting a training image base representing a print on a background, said training images already being classified, then:
- training, from the already classified training image base augmented by at least said synthetic image presenting the background of said first image and representing the second print, of the parameters of said CNN.

15. A classification method for an input image, comprising the implementation of the method according to claim 14 for training parameters a CNN, and then:
- (d) classificating, by said CNN, of said input image by data processing means a client.

16. A non-transitory computer program product comprising code instructions for the execution a method according to claim 1 for augmenting a training image base representing a print on a background, for training parameters a convolutional neural network, CNN, or for classification an input image, when said program is executed on a computer.

17. A non-transitory storage means readable by computer equipment on which a computer program product comprises code instructions for the execution the method according to claim 1 for augmenting a training image base representing a print on a background, for training parameters a convolutional neural network, CNN, or for classification an input image.

18. The method according to claim 13, wherein said biometric prints are fingerprints.

* * * * *